United States Patent
Halasz et al.

[11] 3,855,506
[45] Dec. 17, 1974

[54] SOLID ELECTROLYTE COULOMETER

[75] Inventors: Andrew Halasz, Laval, Quebec;
John D. Childs, Dorval, Quebec;
George H. Fraser, Saint Laurent,
Quebec, all of Canada

[73] Assignee: Unican Security Systems, Ltd.,
Montreal, Quebec, Canada

[22] Filed: Jan. 26, 1973

[21] Appl. No.: 326,976

[52] U.S. Cl. .................. 317/230, 324/182, 324/94,
29/570
[51] Int. Cl. ............................................. H01g 9/05
[58] Field of Search ...... 324/182, 94; 317/230, 231;
29/570

[56] References Cited
UNITED STATES PATENTS

| | | | |
|---|---|---|---|
| 3,443,997 | 5/1969 | Argue et al. | 317/231 UX |
| 3,544,852 | 12/1970 | Giles | 317/230 |
| 3,594,617 | 7/1971 | Kennedy | 317/230 |
| 3,708,729 | 1/1973 | Berger | 317/230 |
| 3,753,051 | 8/1973 | Willy | 317/230 |

OTHER PUBLICATIONS

Kennedy et al; J. Electrochemical Soc.; v 117,n.2;Feb. 1970.pp 263-267.

Primary Examiner—Michael J. Lynch
Assistant Examiner—R. Hille
Attorney, Agent, or Firm—Max Geldin

[57] ABSTRACT

An electrochemical timer or coulometer comprising an assembly of a solid electrolyte, preferably $Ag_7I_4PO_4$, a silver electrode and a detector, e.g. gold, electrode, such assembly being positioned in a metal can. By crimping the upper edge of the metal can which contains the electrodes and the electrolyte, and bringing the components of the assembly into contact, while simultaneously applying high pressure to such an assembly, residual pressure is maintained on the assembly after release of such high pressure, and good electrode-electrolyte contact is ensured. This increases the charge capacity and maximum operating current of the device. The efficiency of the coulometer and its charge retention during storage is further improved by a cycling (i.e., charging and discharging) operation.

29 Claims, 5 Drawing Figures

SOLID ELECTROLYTE COULOMETER

The present invention relates to electrochemical timer devices in the form of coulometers, i.e., timing devices operating on electrochemical principles, and more particularly to improved coulometers comprising a silver electrode, a detector electrode, and a solid electrolyte, having high charge capacity and high maximum operating current, and improved efficiency; and to procedures for producing such timers or coulometers.

There are many practical applications for these low cost timing devices. Included in these uses are warranty devices for household applications, timers for leased business equipment and time integrators for scientific equipment.

In the operation of a coulometer, prior to the timing operation, the coulometer is set or charged by the transfer (by the passage of current) of metal from an active metal (e.g., silver) electrode through the electrolyte in the form of ions to the detector electrode where the metal ions are reduced to the metallic state by the action of the electric current and are deposited on the detector electrode. In the timing or discharging operation, the active metal so deposited is returned by the passage of current in the reverse direction (i.e., with the detector electrode positive and the active metal electrode negative) to the active metal electrode. When the active metal is completely removed from the detector electrode, the potential differences between the active metal and the detector electrode increases, indicating the elapsing of an interval of time $t$. $t$ is related to the weight $w$ of active metal deposited on the detector electrode during the setting or charging operation by Faraday's laws according to the equations $$t = w/W_e I \quad (1)$$

where $I$ is the current at which the coulometer is discharged and $W_e$ is the electrochemical equivalent of the active metal, and $$w = Q_c W_e \quad (2)$$

where $Q_c$ is the charge applied to the coulometer in the setting or charging operation.

In practice, equation (1) must be modified as follows $$t = fw/W_e I \quad (3)$$

where $f$ is the fraction of the stored charge $Q_c$ recovered in the discharge or timing operation, according to the equation $$f = tI/Q_c \quad (4)$$

The closer $f$ is to unity and the smaller its variation, the more efficient is the coulometer.

One object of the present invention is to produce efficient, stable solid electrolyte coulometers.

Coulometers with liquid and solid electrolytes are known. Solid electrolyte devices have advantages over liquid electrolyte devices; namely avoidance of leaks, no gassing, permits greater ease in sealing, permits hermetic sealing, long term stability in operation, long shelf life, producible in various shapes and sizes by molding technology, producible in thin films, and amenable to automated mass production techniques with the subsequent economy derived therefrom.

A disadvantage of coulometers employing solid electrolytes compared to those employing liquid electrolytes is the difficulty in maintaining contact between the electrodes and the electrolyte. Another object of the present invention accordingly is to provide a superior electrode-electrolyte interface contact in solid electrolyte devices such as coulometers.

Whereas tests with solid electrolyte materials have indicated that these can be used in coulometers, standard methods of preparation do not yield reproducible, reliable, stable, highly efficient devices. For example, in coulometers using $RbAg_4I_5$ and prepared by conventional techniques, it has been found that all of the stored charge was not recovered, and that the charge retention was reduced when the coulometer was allowed to stand for a long period of time between the charge and discharge operations.

Thus, in prior art coulometers, the amount of capacity or percentage of theoretical capacity has been limited. Also, reproducibility of such devices has been poor. Further, shelf life has been poor, with capacity deteriorating with time.

However, these difficulties and disadvantages are minimized and the above objects are achieved according to the present invention by novel means for holding or maintaining the electrodes and solid electrolyte of the coulometer together under a constant pressure, and preferably also including certain processing operations, permitting production of electrochemical timers in the form of soliid electrolyte coulometers which are efficient and stable, and in which the factor $f$ of equations (3) and (4) approaches unity and its variation from individual coulometer to coulometer is small. Furthermore, the variation in the efficiency for the novel coulometers hereof is minimal over a range of operating currents, charges, temperatures, and storage intervals of time between the charging (or setting) and the discharging (or timing) operations. Moreover, the coulometers of this invention have increased charge capacity and higher maximum operating current.

Unexpectedly, it has been found that if certain special compressive techniques are used in preparing the solid electrolyte coulometer, a coulometer device with a relatively high degree of accuracy and stability results. This is accomplished by placing the assembly of electrodes and solid electrolyte in contact with each other in a small metal container or can. An edge of the can is bent or crimped over into engagement with the assembly of electrodes and electrolyte, and such assembly is simultaneously compacted together by the application of pressure, as in a press.

In the pressing operation very high pressures are used. As a result of this pressure, the electrodes and the electrolyte are compresed so that they attain near theoretical densities for the respective materials, that is, approaching theoretical density, and an exceptionally uniform and complete contact between the electrodes and the electrolyte occurs at their respective interfaces. Further, under such high pressures, the can and contents are retained in the required physical form by the die used for compression. This permits the use of light walled, low cost cans, while allowing forming pressures far exceeding the yield strength of the container. When the high pressure is released the can and the crimping process maintain the same physical form of the assembly and retain a residual, but reduced, clamping pressure across the electrode-electrolyte interfaces, which maintains the electrodes and the solid electrolyte near, that is approaching, their respective theoretical densities and in substantially complete uniform interfacial contact.

Because the can is bent or crimped into engagement with the electrolyte-electrode assembly, residual pressure is thereby maintained on the solid electrolyte and electrodes after the pressing operation. This compression technique thus provides a closure for the coulometer and exerts the above noted residual pressure on the device after removal of the device from the press or die, leaving the electrolyte-electrode assembly under a substantially constant pressure load. Such residual pressure is of a magnitude and a nature such that the electrode-electrolyte interfaces are maintained in uniform complete contact and the materials forming the solid electrolyte and the electrodes are maintained close to their respective theoretical densities.

A metal disc and a fiber or plastic washer are employed to evenly distribute the pressure generated by the crimp. The improved performance of such coulometers resulting from this novel compressive technique is due to the maintenance of a substantial residual pressure on the electrode-electrolyte interface, thus ensuring intimate contact of the solid electrolyte with the electrodes during the operation of the coulometers.

A second unexpected discovery was that the efficiency of the coulometers of the invention is further improved by repeated cycling, i.e., charging and discharging. Thus, a coulometer is charged with a quantity of electricity $Q_c$. Upon discharge at current I, the time interval of discharge $t$ is given by equation (3), where $f$ is found to have predictable value less than unity. When the charging and discharging of the device is repeated several times, the factor $f$ approaches closer to unity each cycle. After four or five cycles, the change in $f$ is negligible and levels off at a stable predictable value, varying with the particular electrolyte used. Thus, by such recycling, a high stable efficiency approaching 100 percent can be achieved employing the invention device and using a silver phosphate iodide solid electrolyte, as pointed out in greater detail hereinafter.

A further advantage of cycling is that it reduces the dependence of efficiency on temperature. This means that greater accuracy can be obtained when the coulometer is subjected to a range of temperatures during operation. Thus, two sets of coulometers which had not been cycled previously were discharged at 2.5 μa (microamps), one set being discharged at room temperature and one set at −40°C. Those discharged at room temperature had an average efficiency of 89 percent and those discharged at −40°C had an average efficiency of 98 percent. Thus, better efficiency was obtained at the lower temperature. However, by cycling the coulometers, the efficiency at room temperature can be raised to 96 percent or better. Therefore, cycling can increase substantially the room temperature efficiency to closely match the high efficiency of the coulometer at low temperatures of operation of the order of −40°C.

Thus the above-noted improvements in the performance of the solid electrolyte coulometer of the invention are achieved by a combination of the above pressurizing and cycling features. Although these two features when used in conjunction maximize the performance of the coulometer, a high capacity accurate and stable coulometer can be produced according to the invention, and embodying only the above pressurizing feature without cycling. For example, if the charge applied to the coulometer is a large one, it may be tedious to carry out several cycles of charging and discharging. However, since the efficiency $f$ is known accurately as a function of the number of cycles, the time $t$ for the first discharge of a coulometer with a charge $Q_c$ at a current I can be accurately predicted from equations (3) and (4). Thus a coulometer embodying the pressurizing feature of the invention but not conditioned by cycling can be made to function as an accurate timing device.

The improved coulometer device of the invention will operate using silver-containing complex metal solid electrolytes, which are highly conductive. These are generally silver ion conducting electrolytes based on AgI in which the AgI is modified by anion substitution, as in $Ag_3SI$, or by cation substitution, as in $RbAg_4I_5$. Examples of each solid electrolytes include $Ag_7I_4PO_4$, $Ag_{19}I_{15}P_2O_7$, $RbAg_4I_5$, $KAg_4I_5$, $NH_4Ag_4I_5$, $Ag_3SI$, $Ag_2HgI_4$, $(CH_3)_4NI\cdot 6AgI$, $KAg_4I_4CN$, and $RbAg_4I_4CN$, or mixtures thereof. However, and unexpectedly, it has been found that the compressive feature of the invention has its greatest effect, and the best results obtained from the standpoint of producing coulometers of greater accuracy, stability and reproducibility when employing silver phosphate iodides, particularly $Ag_7I_4PO_4$, which is therefore the preferred electrolyte. $Ag_{19}I_{15}P_2O_7$, a related phosphate, is also a preferred electrolyte.

The active electrode of the invention coulometer is a silver electrode formed from silver powder. Although silver powder alone can be used, preferably such silver powder is mixed with solid electrolyte powder, e.g. in proportions ranging from about 25 percent to about 75 percent silver powder and about 75 percent to about 25 percent solid electrolyte powder, by weight, such as a 50–50 mixture of these materials, in order to obtain more efficient and intimate contact between the active silver electrode and the solid electrolyte. Particle size of such silver and solid electrolyte powders can range from about 140 to about 400 mesh size, based on standard screen sizes.

The detector electrode of the invention coulometer can be any suitable electrode for this purpose, examples of which are gold powder, titanium powder, carbon powder, a gold plated copper disc and others such as the platinum family.

The features and advantages of the present invention will become more apparent from the following detailed description of one specific embodiment thereof, when taken in conjunction with the accompanying drawing wherein.

The drawings are exaggerated for greater clarity.

Figure 1:
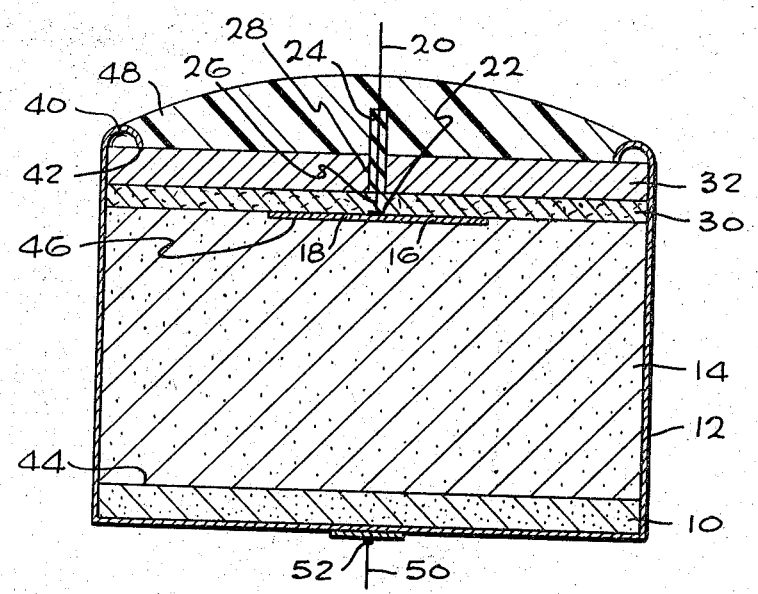
FIG. 1 is a sectional view in elevation of a coulometer according to the present invention.
Figure 2:
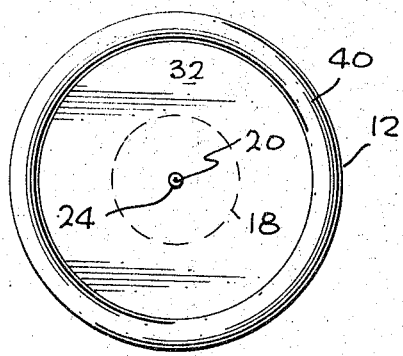
FIG. 2 is a plan view of the device of FIG. 1, with the top epoxy seal removed.
Figure 3A:
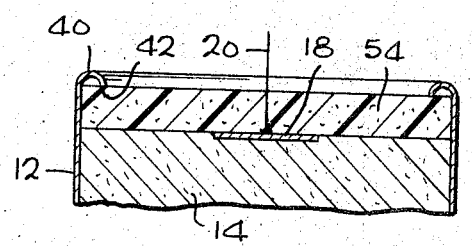
FIG. 3a illustrates a modification of the device shown in FIG. 1.
Figure 3:
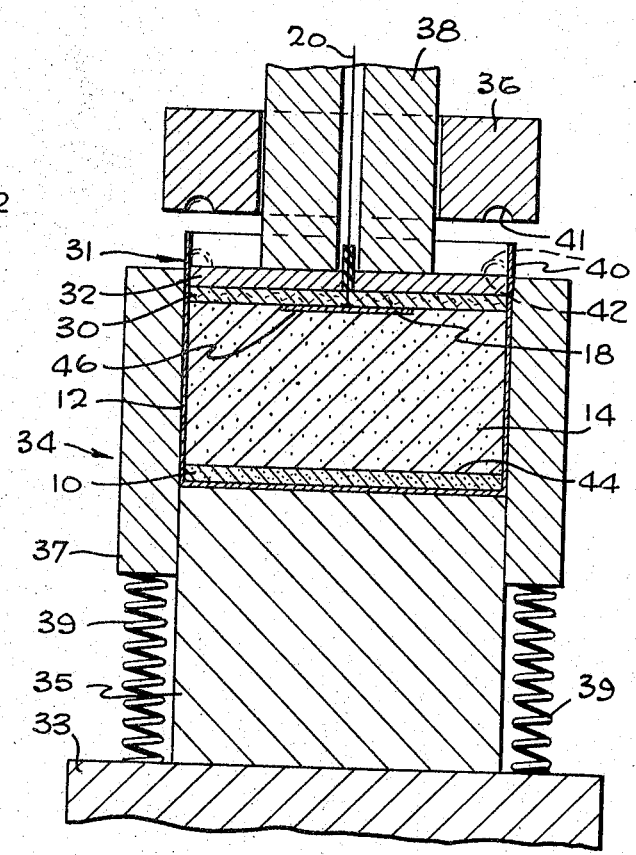
FIG. 3 illustrates application of the simultaneous compressing and crimping operation for producing the coulometer of FIG. 1.

Referring to FIGS. 1 to 3, a mixture 10 of silver powder and solid electrolyte powder, preferably containing 50 percent by weight of each, is distributed evenly over the bottom of a small metal can 12. Solid electrolyte powder 14 is spread over the mixture 10 and is compressed slightly. A small cavity 16 is pressed in the solid electrolyte layer 14 and this cavity is filled with gold powder 18. A wire 20 with a flattened end 22 and bearing an insulating sleeve 24 is inserted through small holes 26 and 28 in the center of a fishpaper disc 30 and a brass disc 32, respectively. This assembly of discs 30 and 32 is placed in contact with the gold detector electrode 18.

The entire assembly 31 is then placed in a press 34 (see FIG. 3) comprising a base 33 on which is positioned a solid support 35, the assembly 31 being mounted on such base. A circular die 37 surrounds the can 12, such die being supported on compression springs 39. The assembly 31 is positioned under a crimping tool indicated at 36 having a circular channel 41, which is specially designed for the purpose, and during downward movement of the crimping tool 36, the assembly of components 10, 14, 18, 30 and 32 within can 12, is simultaneously compressed by platen 38 at pressures which can range from about 5,000 to about 100,000 psia. The actual pressure or load depends on the size and material of construction of the can 12. The crimping operation causes the top edge portion 40 of the can 12 to be bent over as illustrated in dotted lines in FIG. 3, and shown in full lines in FIG. 1, with the outer edge 42 of edge portion 40 in tight engaging contact with the upper surface of brass disc 32, thus pushing the brass disc 32 and the fishpaper disc 30 against the detector electrode 18 and the solid electrolyte 14. This ensures good contact between the detector electrode 18 and the electrolyte 14 and between the active silver electrode 10 and the electrolyte 14. The die 37 around can 12 maintains the can 12 and its contents in their initial physical shape without any buckling of the can, even though high pressures are applied. Pressure applied against the die 37 is absorbed by the springs 39.

Upon release of the pressure applied at 38, retraction of the crimping tool 36, and removal of the container 12 and its contents from the press 34, a substantial residual pressure will still be applied by the crimped edge 42 against the electrode-electrolyte assembly. Such residual pressure can vary considerably dependent on factors such as the material of construction and strength of the can, and can range, for example, from about 10 percent to about 50 percent of the pressure applied in the press. Thus, the two electrode-electrolyte interfaces at 44 and 46 will always be maintained under pressure during the operation of the coulometer. The residual pressure generated by thus crimping the can is distributed evenly by means of the brass disc 32 and the fishpaper washer or disc 30. The insulator sleeve 24 keeps the detector electrode 18 from shorting to the can 12. To exclude humid air and produce a hermetic seal the coulometer is sealed by means of a suitable sealant such as a fast curing epoxy, at 48. The negative lead 50 can be applied to the can 12 as by soldering at 52, before or after the crimping operation.

Modifications can be made without altering the essential principles of the invention. The gold powder electrode 18 can be replaced by other detector electrodes such as a gold-plated copper disc. It is important to note that while the gold detector electrode is a flat planar configuration, curvalinear surfaces may be employed in order to distribute current more uniformly, deposit silver evenly and prevent dendritic formations at the edges of the electrode. If a gold-plated copper disc is employed for this purpose, the positive lead 20 can be soldered to it. Metals other than brass, e.g., stainless steel and nickel-iron alloy, can be used for the disc 32. Plastics such as polyethylene, polypropylene or Teflon (polytetrafluoroethylene) can be used as the insulating disc or washer 30, in place of fishpaper, which is also known as hard fiber or vulcanized fiber. The combined functions of the metal disc 32 and of the insulating washer 30 can also be accomplished in a single component assembly consisting of a washer of high strength, insulating material, such as glass fiber reinforced plastics or reinforced resins e.g. glass filled phenolic. Such a modificationn is illustrated in FIG. 3a, wherein numeral 54 is a single high strength washer formed of one of the materials noted above employed in place of components 30 and 32 of the device of FIG. 1, the crimped edge 42 of the can being in contact with such high strength insulating washer 54. The container or can which houses the electrodes and solid electrolyte can be constructed of any suitable material having good strength but which can be readily bent or crimped into tight engagement with the electrode-electrolyte assembly to maintain pressure thereon, as noted above. For this purpose the container thus can be composed for example, of stainless steel, nickel-iron alloy, titanium, brass, and the like.

Figure 4:
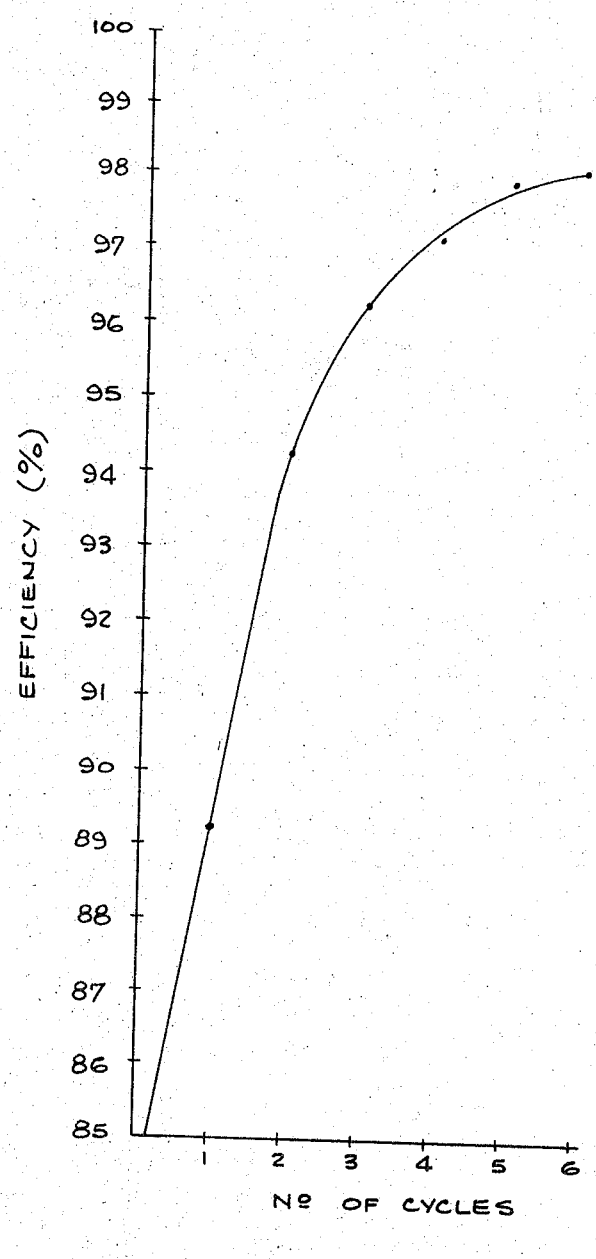
FIG. 4 is a plot illustrating increasing the efficiency of the coulometer of the invention by cycling.

The crimped can technique described above permits the construction of coulometers with much higher charge capacity and operating current compared to coulometers made simply by compacting electrode and electrolyte powder into a pellet. Additional unexpected improvements are obtained in the efficiency and stability of the coulometer, as previously noted, by the auxiliary cycling techniques; i.e. by repeated charging and discharging. This latter operation is carried out as follows. A quantity of charge $Q_c$ is applied to a coulometer by direct current. The coulometer is then discharged at a current I in a time $t$ by passing direct current in the opposite direction. The quantities, $Q_c$, I, and $t$ are related by equation (4). After the first discharge, the coulometer is recharged with the quantity of charge $Q_c$ and again discharged at a current I. This is repeated several times. The efficiency factor or term $f$ of equation (4) increases with the number of cycles, approaching unity, but levels off after four or five cycles. This phenomenon is shown in FIG. 4 for a typical coulometer according to the invention, as described in Example 1 below. This improvement upon cycling was observed for all of the above-noted silver-containing complex metal solid electrolytes, but the preferred solid electrolytes, however, are the silver phosphate iodides, particularly $Ag_7I_4PO_4$ and $Ag_{19}I_{15}P_2O_7$, since the use of these electrolytes most dramatically improves efficiency upon cycling, stability and consistency of the coulometer of the invention.

The following examples illustrate the practice of this invention, but are not intended as limitative.

EXAMPLE 1

$Ag_7I_4PO_4$ was prepared by vacuum fusion, and was sieved through a No. 325 mesh screen. Ten g.(grams) of this material was thoroughly mixed with 10 g. of silver powder. A coulometer as illustrated in FIG. 1 of the drawing was assembled as follows. 0.05 g. of the silver-solid electrolyte mixture was spread over the bottom of a can 0.370 inch in internal diameter, 0.010 inch in wall thickness, and 0.187 inch high, made from gas-free glass sealing nickel-iron alloy No. 46 (46 percent nickel). 0.40 g. of the $Ag_7I_4PO_4$ powder was added and the two layers were compressed slightly. A small cavity was pressed in the solid electrolyte and 0.05 g. of fine gold powder was placed in the cavity. A nickel-coated copper wire bearing an insulating sleeve was inserted through a fishpaper disc and a brass disc, positioned over the solid electrolyte and gold powder electrode. The wire was bent at one end and flattened. The flattened portion was placed against the gold electrode. The whole assembly was placed on a Carver laboratory press and under a crimping tool, as illustrated in FIG. 3, and compressed at 1000 pounds total force while the upper edge of the can was simultaneously crimped inwardly into tight contact with the upper surface of the brass disc. A negative lead was soldered to the bottom of the can. A fast curing epoxy was applied to the top of the can to exclude moisture.

The highest charge capacity at $I \leq 1$ ma (milliamp) was 120,000 $\mu$a-min. Higher current (up to 10 ma) can be employed, but capacity is diminished, for example, to 2,000 $\mu$a-min. at 10 ma.

This coulometer was charged for 5 minutes at 700 $\mu$a (microamps) and then immediately discharged. Such charging and discharging was repeated for several cycles. The efficiency of each of the first six cycles is noted in the plot of FIG. 4 of the drawing, and showing that such efficiency increased from 89 percent for the first cycle to 98 percent for the sixth cycle, where it levelled off. The detector electrode is 0.03 in.$^2$ in this case.

The coulometer was placed in a beaker of water for two days to test the epoxy sealing. Thereafter, it was removed and tested. No deterioration in its performance was noted.

Such coulometer can be employed as a warranty device for washing machines.

EXAMPLE 2

A coulometer was made as follows: 0.05 g. of the silver-solid electrolyte mixture prepared in Example 1 was placed in a die whose cavity was 0.354 inch in diameter. It was pressed lightly. Then 0.40 g. of the $Ag_7I_4PO_4$ powder prepared in Example 1 was added and pressed lightly. Finally 0.05 g. of gold powder was added. Then the three layers of powder were pressed under 5,000 pounds on the Carver laboratory press but without application of the crimping procedure. Leads were attached to the electrodes with silver-filled epoxy. The whole assembly was encapsulated in an insulating epoxy resin.

The highest current at which this coulometer operated was 100 $\mu$a. The highest charge capacity it could achieve was 500 $\mu$a-min. This shows the marked improvement of the invention coulometer of Example 1, wherein substantially higher charge capacity and substantially higher current are achieved.

EXAMPLE 3

Fourteen coulometers were prepared by the method of Example 1 using $Ag_7I_4PO_4$ electrolyte. They were charged for 50 minutes at 1 ma. Eight of them were stored at room temperature for 2 months, after which they were discharged at 1 ma. 86 to 93 percent of the charge was recovered; i.e., the efficiency factor $f$ was 0.86 to 0.93. Three of them were stored at 50°C for 2 weeks and then discharged at 1 ma. 91 to 92.5 percent of the charge was recovered. Three coulometers were stored at 65°C for one week and then discharged at 1 ma. 86 to 90 percent of the charge was recovered.

EXAMPLE 4

Six coulometers were prepared by the method of Example 1. This time, however, $RbAg_4I_5$ was used as the electrolyte. They were charged at 500 $\mu$a for 5 minutes and discharged at the same current. The charge recovery upon discharge was 91 to 98 percent. When the coulometers were recharged under the same conditions and stored for 4 days, only 59 – 79 percent of the charge was recovered. They were charged again and stored overnight. 66 – 89 percent of the charge was recovered.

EXAMPLE 5

A coulometer was prepared by the method of Example 1, but employing $RbAg_4I_5$ as the electrolyte. The coulometer was charged at 720 $\mu$a for 60 minutes and then discharged. Such charging and discharging was repeated for three additional cycles. The efficiency for each of the four cycles is noted below.

| Cycle | Efficiency (%) |
| --- | --- |
| 1 | 82 |
| 2 | 90 |
| 3 | 94 |
| 4 | 94 |

EXAMPLE 6

A coulometer was prepared by the method of Example 1. This time $Ag_3SI$ was used as the electrolyte. It was charged at 100 $\mu$a for 8 minutes and discharged at 100 $\mu$a. This charge-discharge procedure was repeated for three additional cycles. Efficiency of the coulometer for each of the four cycles was as follows:

| Cycle | Efficiency (%) |
| --- | --- |
| 1 | 80 |
| 2 | 89 |
| 3 | 92 |
| 4 | 93 |

EXAMPLE 7

A coulometer was prepared by the method of Example 1. This time, however, $RbAg_4I_5$ was used as the electrolyte and titanium powder was used instead of gold powder.

Operating and efficiency results obtained are comparable to those of Example 5.

EXAMPLE 8

Eight coulometers were prepared by a method similar to that of Example 1, using $Ag_7I_4PO_4$ electrolyte. Instead of gold powder, a gold-plated copper disc served as the detector electrode. A larger size of can (internal diameter 0.437 inch; height 0.219 inch) was employed.

Three coulometers were charged at 750 $\mu$aa for 18 minutes, 17 seconds; i.e., the charge was 13,720 $\mu$a-min. They were discharged at 4 $\mu$a. Their efficiencies were 88.7 percent, 88.1 percent, and 88.2 percent respectively. They were recharged at 750 $\mu$a for 18 minutes, 17 seconds and again discharged at 4 $\mu$a. This time the efficiencies improved to 94.2 percent, 93.2 percent, and 94.3 percent respectively.

The other five were charged at 750 $\mu$a for 128 minutes; i.e., the charge was 96,000 $\mu$a-min. Four of them were discharged at 4 $\mu$a. Their efficiencies were 86.7–88.6 percent. The fifth was discharged at 750 $\mu$a. Its efficiency was 86 percent. Upon recharging and discharging under the same conditions, its efficiency increased to 94 percent. Then it was recharged at 750 $\mu$a for 128 minutes and discharged at 4 $\mu$a with 100 percent efficiency.

Thus, the advantageous effect of cycling is demonstrated clearly by the above results.

These devices can be used for auto component warranty.

EXAMPLE 9

Three coulometers were prepared by the method of Example 8. This time, however, $Ag_{19}I_{15}P_2O_7$ was used as the electrolyte. They were charged for ten minutes at 750 $\mu$a. and then discharged at 750 $\mu$a. Results are shown in the table below.

| Coulometer | Efficiency (%) | |
|---|---|---|
| | Cycle No. 1 | Cycle No. 2 |
| 1 | 92 | 93 |
| 2 | 92 | 93 |
| 3 | 89 | 93 |

From the table above an improvement of efficiency due to cycling was noted for each of the coulometers using $Ag_{19}I_{15}P_2O_7$ as electrolyte.

EXAMPLE 10

Four coulometers were prepared using $Ag_7I_4PO_4$ electrolyte by a method similar to that used in Example 1. This time, however, the detector electrode was carbon powder containing 1% polysulfone. A smaller can (internal diameter 0.380 inch; height 0.187 inch) made of stainless steel was employed. The coulometers were charged at 250 $\mu$a for 5 minutes and then discharged at 250 $\mu$a. Results are shown in the table below.

| Coulometer | Cycle No. | Efficiency (%) | | | | |
|---|---|---|---|---|---|---|
| | | 1 | 2 | 3 | 4 | 5 |
| 1 | | 89 | 95 | 97 | 98 | 98 |
| 2 | | 89 | 95 | 96 | 97 | 98 |
| 3 | | 89 | 95 | 97 | 98 | 98 |
| 4 | | 90 | 95 | 96 | 97 | 98 |

Again the improvement of efficiency due to cycling is noted from the table above.

These coulometers could be operated at currents up to 5 ma.

From the foregoing, it is seen that the invention provides a novel electrochemical timer or coulometer device of high charge capacity and efficiency, and which is highly reproducible, such device having good accuracy and extended shelf life, and being readily and economically constructed. Such device contains means maintaining pressure on and tight contact between the electrode and solid electrolyte components, and preferably also is subjected to cycling for further improving efficiency. The device has many fields of applications in elapsed time indication, memory storage and cyclic charge and discharge, including such specific uses as warranty time totalizers, cycle timers in electrical appliances, battery charge control, process monitoring and control and radio transmission control.

While we have described particular embodiments of our invention for the purpose of illustration within the spirit of the invention, it will be understood that the invention is not to be taken as limited except by the scope of the appended claims.

We claim:

1. An electrochemical timer device comprising a container, an assembly of a pair of electrodes of opposite polarity and a solid electrolyte disposed between said electrodes, said assembly positioned within said container, the upper edge portion of said container being crimped inwardly, with the crimped upper edge of said container in operative engagement with said assembly and compressing said electrodes and solid electrolyte together with a substantial pressure, said electrodes and said solid electrolyte maintained in substantially complete uniform interfacial contact, the materials of said electrodes and said electrolyte approaching their respective theoretical densities.

2. An electrochemical timer device as defined in claim 1, one of said electrodes being a silver electrode and the other electrode being a detector electrode, said solid electrolyte being a silver-containing complex metal solid electrolyte.

3. An electrochemical timer device as defined in claim 2, said detector electrode being selected from the group consisting of gold, titanium, carbon, gold-plated copper and platinum, and said solid electrolyte selected from the group consisting of $Ag_7I_4PO_4$, $Ag_{19}I_{15}P_2O_7$, $RbAg_4I_5$, $KAg_4I_5$, $NH_4Ag_4I_5$, $Ag_3SI$, $Ag_2HgI_4$, $(CH_3)_4NI \cdot 6AgI$, $KAg_4I_4CN$, and $RbAg_4I_4CN$.

4. An electrochemical timer device as defined in claim 1, one of said electrodes being a silver electrode and the other electrode being a detector electrode, said solid electrolyte being a silver-containing complex metal solid electrolyte, said detector electrode being selected from the group consisting of gold, titanium, carbon, gold-plated copper, and platinum, and said solid electrolyte selected from the group consisting of $Ag_7I_4PO_4$, $Ag_{19}I_{15}P_2O_7$, $RbAg_4I_5$, $KAg_4I_5$, $NH_4Ag_4I_5$, $Ag_3SI$, $Ag_2HgI_4$, $(CH_3)_4NI \cdot 6AgI$, $KAg_4I_4CN$ and $RbAg_4I_4CN$.

5. An electrochemical timer device as defined in claim 2, said solid electrolyte being a silver phosphate iodide.

6. An electrochemical timer device as defined in claim 4, said solid electrolyte being a silver phosphate iodide.

7. An electrochemical timer device as defined in claim 1, and including a high strength insulating member positioned in contact with one of said electrodes, said crimped edge of said container being in contact with said insulating member.

8. An electrochemical timer device as defined in claim 4, said container being metal, and including a first insulating member positioned in contact with one of said electrodes and a second metal member disposed in contact with said insulating member, said crimped edge of said container being in contact with said second metal member.

9. A coulometer comprising a metal can, a silver powder electrode disposed in the bottom of said can, a silver-containing complex metal solid electrolyte powder positioned over said silver power electrode, a detector electrode positioned over said solid electrolyte powder, an insulator disc positioned over said detector electrode and a metal disc positioned over said insulator disc, the upper edge portion of said can being crimped inwardly, with the crimped upper edge of said can in tight contact with said metal disc and compressing said detector electrode, said solid electrolyte powder and said silver electrode powder together with a substantially constant pressure, said pressure being substantial, said electrode and said solid electrolyte maintained in substantially complete uniform interfacial contact, the materials of said electrodes and said electrolyte approaching their respective theoretical densities.

10. A coulometer as defined in claim 9, said detector electrode being selected from the group consisting of gold, titanium, carbon, gold-plated copper, and platinum, and said solid electrolyte selected from the group consisting of $Ag_7I_4PO_4$, $Ag_{19}I_{15}P_2O_7$, $RbAg_4I_5$, $KAg_4I_5$, $NH_4Ag_4I_5$, $Ag_3SI$, $Ag_2HgI_4$, $(CH_3)_4NI \cdot 6AgI$, $KAg_4I_4CN$, and $RbAg_4I_4CN$.

11. A coulometer as defined in claim 10, said silver electrode consisting of a mixture of about 25 to about 75 percent of silver powder and about 75 to about 25 percent of said solid electrolyte powder.

12. A coulometer as defined in claim 9, said solid electrolyte powder being a silver phosphate iodide selected from the group consisting of $Ag_7I_4PO_4$ and $Ag_{19}I_{15}P_2O_7$.

13. A coulometer as defined in claim 12, said silver electrode consisting of a mixture of about 25 to about 75 percent of silver powder and about 75 to about 25 percent of said solid electrolyte powder.

14. A coulometer as defined in claim 13, said detector electrode being gold powder.

15. A coulometer as defined in claim 14, including a first electrical lead connected to said gold detector electrode, said first lead passing through said insulator disc and said metal disc, and a second electrical lead connected to said metal can.

16. A coulometer as defined in claim 15, said insulator disc being a fiber disc and said metal disc being a brass disc.

17. The process for producing an improved electrochemical timer containing an assembly of a pair of electrodes of opposite polarity and a solid electrolyte disposed between said electrodes, comprising placing said assembly in a container, subjecting said assembly in said container to a high compressive force in a substantially completely enclosed die, while simultaneously crimping an upper edge portion of said container inwardly against said assembly, with the crimped upper edge of said container in operative engagement with said assembly, and releasing said compressive force, said crimped edge of said container compressing said electrodes and said electrolyte together under a substantial residual pressure.

18. The process as defined in claim 17, said compressive force being sufficient to compress said electrodes and said solid electrolyte so that they approach their respective theoretical densities, and said electrodes and electrolyte are in complete uniform interfacial contact, and upon release of said compressive force, said residual force maintains said electrodes and solid electrolyte in said aforementioned conditions.

19. The process as defined in claim 18, said compressive force ranging from about 5,000 to about 100,000 psia.

20. The process as defined in claim 17, including subjecting said timer to direct current charging and discharging to increase the efficiency of said timer.

21. The process as defined in claim 20, said charging and discharging comprising one cycle, said direct current charging and discharging being repeated for a plurality of cycles.

22. The process as defined in claim 17, including subjecting said timer to a plurality of cycles of direct current charging and discharging to increase the efficiency of said timer.

23. An electrochemical timer as defined in claim 1, at least one of said electrodes comprising silver powder and said solid electrolyte comprising solid electrolyte powder.

24. An electrochemical timer as defined in claim 23, said silver electrode consisting essentially of a mixture of silver powder and solid electrolyte powder.

25. The process as defined in claim 17, said compressive force ranging from about 5,000 to about 100,000 psia and said residual pressure ranging from about 10 to about 50 percent of said compressive force.

26. An electrochemical timer device as defined in claim 1, said pressure ranging from about 500 to about 50,000 psia.

27. An electrochemical timer device as defined in claim 1, including an insulating member positioned on one of said electrodes, said crimped upper edge of said container being in contact with said member.

28. The process as defined in claim 18, one of said electrodes comprising silver powder and said solid electrolyte comprising solid electrolyte powder.

29. An electrochemical timer device comprising a container, an assembly of a pair of electrodes of opposite polarity and a solid electrolyte disposed between said electrodes, said assembly positioned within said container, means connected to said container in operative engagement with said assembly and compressing said electrodes and solid electrolyte together with a substantial pressure, said electrodes and said solid electrolyte maintained in substantially complete uniform interfacial contact, the materials of said electrodes and said electrolyte approaching their respective theoretical densities.

* * * * *